US005118080A

United States Patent [19]

Hartmann

[11] Patent Number: 5,118,080

[45] Date of Patent: Jun. 2, 1992

[54] VALVE PISTOL FOR A HIGH PRESSURE CLEANING APPARATUS

[75] Inventor: Lothar Hartmann, Oerlinghausen, Fed. Rep. of Germany

[73] Assignee: Suttner GmbH & Co. KG, Oerlinghausen, Fed. Rep. of Germany

[21] Appl. No.: 551,169

[22] Filed: Jul. 11, 1990

[30] Foreign Application Priority Data

Jul. 15, 1989 [DE] Fed. Rep. of Germany ....... 3923499
Aug. 10, 1989 [DE] Fed. Rep. of Germany ....... 3926461

[51] Int. Cl.[5] ........................ F16K 31/60; G05G 1/04; G05G 5/06

[52] U.S. Cl. ........................ 251/229; 74/523; 239/526; 251/233; 251/239; 251/244; 251/321

[58] Field of Search ............... 251/235, 237, 238, 239, 251/242, 244, 245, 246, 297, 321, 322, 323, 233; 74/526, 527, 528, 531, 532, 543; 239/525, 526

[56] References Cited

U.S. PATENT DOCUMENTS

| | | | |
|---|---|---|---|
| 343,830 | 6/1886 | Miller | 251/246 |
| 1,850,966 | 3/1932 | Harris | 251/238 |
| 2,019,257 | 10/1935 | Gibbs | 251/246 |
| 2,054,136 | 9/1936 | Pfaff et al. | 239/526 |
| 2,079,933 | 5/1937 | Fisher | 239/526 |
| 2,141,266 | 12/1938 | Dickerson | 74/531 |
| 2,159,821 | 5/1939 | Sandberg et al. | 74/531 |
| 2,173,255 | 9/1939 | Jandus | 74/531 |
| 2,318,933 | 5/1943 | Eilers et al. | 251/239 |
| 2,643,678 | 6/1953 | Paradise | 251/238 |
| 2,716,014 | 8/1955 | Dinkelkamp | 251/238 |
| 2,732,171 | 1/1956 | Paradise | 251/233 |
| 3,986,700 | 10/1976 | Carpentier | 251/235 |
| 4,061,250 | 12/1977 | Tada | 251/244 |
| 4,898,130 | 2/1990 | Parsons | 251/238 |

FOREIGN PATENT DOCUMENTS

| | | | |
|---|---|---|---|
| 3518492 | 11/1986 | Fed. Rep. of Germany | 239/525 |
| 3527922 | 2/1987 | Fed. Rep. of Germany . | |
| 513013 | 10/1939 | United Kingdom . | |

*Primary Examiner*—George L. Walton
*Attorney, Agent, or Firm*—Sixbey, Friedman, Leedom & Ferguson

[57] ABSTRACT

In a valve pistol, particularly for a high pressure cleaning device, with a pistol housing (1) with a handle (2), with a valve (3) placed in the pistol housing (1) that is opened against the system pressure by a force transmission element that is displaced against a valve body (9) by a hand lever (12) that is mounted so that it can be pivoted on a pivot pin (11) in the pistol housing (1). The hand lever (12) can be pivoted over a certain pivoting path and has an actuating arm (13) that engages against the force transmission element (10). In accordance with a preferred embodiment, with little construction expense, it can be achieved that the holding force required on the hand lever (12) can be made as small as possible even when the valve body is opened, in that the pivot pin (11) is mounted in the pistol housing (1) or in the hand lever in a slot (14) extending approximately in the direction of movement of the force transmission element (10) and can be shifted in this slot, so that a shifting movement is partially superposed on the pivoting movement of hand lever (12) around the pivot pin (11), that the shifting movement of hand lever (12) is derived from its pivoting movement and for this purpose an effective drive connection, particularly a wedge-like connection is provided between the hand lever (12) and the pistol housing (1) or an L-shaped part for the pressure medium, and that a drive part is mounted on the hand lever (12) at a distance from the pivot pin (11) and a stationary support part, particularly a support roller (b 17), is installed on the pistol housing (1) or on the L-shaped part (6).

16 Claims, 5 Drawing Sheets

VALVE PISTOL FOR A HIGH PRESSURE CLEANING APPARATUS

BACKGROUND OF THE INVENTION

The invention relates to a valve pistol, in particular for a high pressure cleaning device, with a pistol housing with a handle, with a valve placed in the pistol housing that is opened against the system pressure by a force transmission element that produces an opening movement of a valve body, with a hand lever mounted so that it can be pivoted on a swivel pin in the pistol housing on the handle over a certain pivoting path and has an actuating arm that comes to rest against the force transmission element, where the force transmission element can be shifted by an actuating arm over a determined actuation path, and where, between the hand lever and the actuating arm, there is a certain lever ratio.

The known valve pistol, relative to which the invention represents a further development (German 3 518 492) has a ball valve with a spring loaded valve ball as a valve body. When the valve body is closed, the essential force component is the component from the system pressure. The force required for opening the valve results as a product of the system pressure and the cross-section area of the valve seat. By the lever ratio of the hand lever, the actuating path is determined. For the lever ratio there exists, per se, a lower limit, which is determined by the available swing gear of the hand lever and the minimum required actuating travel of the plunger.

In contrast to other known valve pistols, during initial opening of the above-noted valve, a large lever ratio is provided since the actuating arm is very short in comparison with the hand lever. Thus, during the initial opening of the valve body at a system pressure of 250. bars for example, a reduction of the opening force on the hand lever down to 20 to 30 N can be achieved instead of the previously known 100 N. By a second swivel pin, which starts to function after the opening of the valve, it is simultaneously achieved that, when the valve body is open, the necessary holding force is as small as before, in other words, for example, it amounts only to about 10 N.

Moreover, the holding force can be even further reduced when the valve body is opened by working with a double lever gear reduction (DE-C 3 527 922) or by using a toggle drive (GB-A 513 013). However, both have significant disadvantages, namely, they are extremely expensive to construct and in turn lead, in any case, with the toggle drive, to a loss in lever arm when the valve body is opened, and thus to an increase in the opening force.

SUMMARY OF THE INVENTION

The teaching of the invention relates to valve pistols of the previously explained design in general, thus without being limited to the area of high pressure cleaning devices. Nevertheless to simplify the explanation, now and below, the invention is explained using the example of a valve pistol for a high pressure cleaning device, particularly because the invention has particular significance for this area of use. Further the teaching of the invention is not dependent on whether the valve body of the valve is opened by pressing or pulling, nor thus whether a plunger or a drawbar, a traction rope or the like is used as a force transmission element. Despite this, the force transmission element will be designated below from time to time as a plunger, because force transmission elements designed as plungers are particularly widespread in valve pistols of the kind in question.

The object of the invention is to develop the initially explained known valve pistol, which is already very suitable with regard to the opening force at little construction cost, so that the necessary holding force on the hand lever, even when the valve body is opened, can be made to be as little as possible.

The object indicated above is attained in a valve pistol with the features initially mentioned by the the fact that the pivot pin is mounted in a slot in the pistol housing or in the hand lever which extends approximately in the direction of the movement of force transmission element and can be shifted in this slot, so that the shifting movement is partially superposed on the pivoting movement of the hand lever with the actuating arm around the pivot pin. Further contributing to this result is the fact that the shifting movement of hand lever is derived from the pivoting movement, and for this purpose, an effective gear connection, particularly, a Wedge gear connection, is provided between the hand lever and the pistol housing, and in that a stationary support part, particularly a support roller, is mounted on the hand lever at a distance from the swivel axis, and on the pistol housing.

In a very simple way, namely by the superposition of a shifting movement over a pivoting movement around the first pivot pin with a simple slot/gear connection, it is attained, here, that even when the valve body is opened the holding force can be made minimal. The holding force can be made to be as small as desired, and thus, practically reduced to zero, by configuring the gear connection.

A preferred embodiment and further developments of the invention are further described below relative to a preferred embodiment and the figures of the drawings.

DETAILED DESCRIPTION OF THE PREFERRED EMBODIMENT

Figure 1:
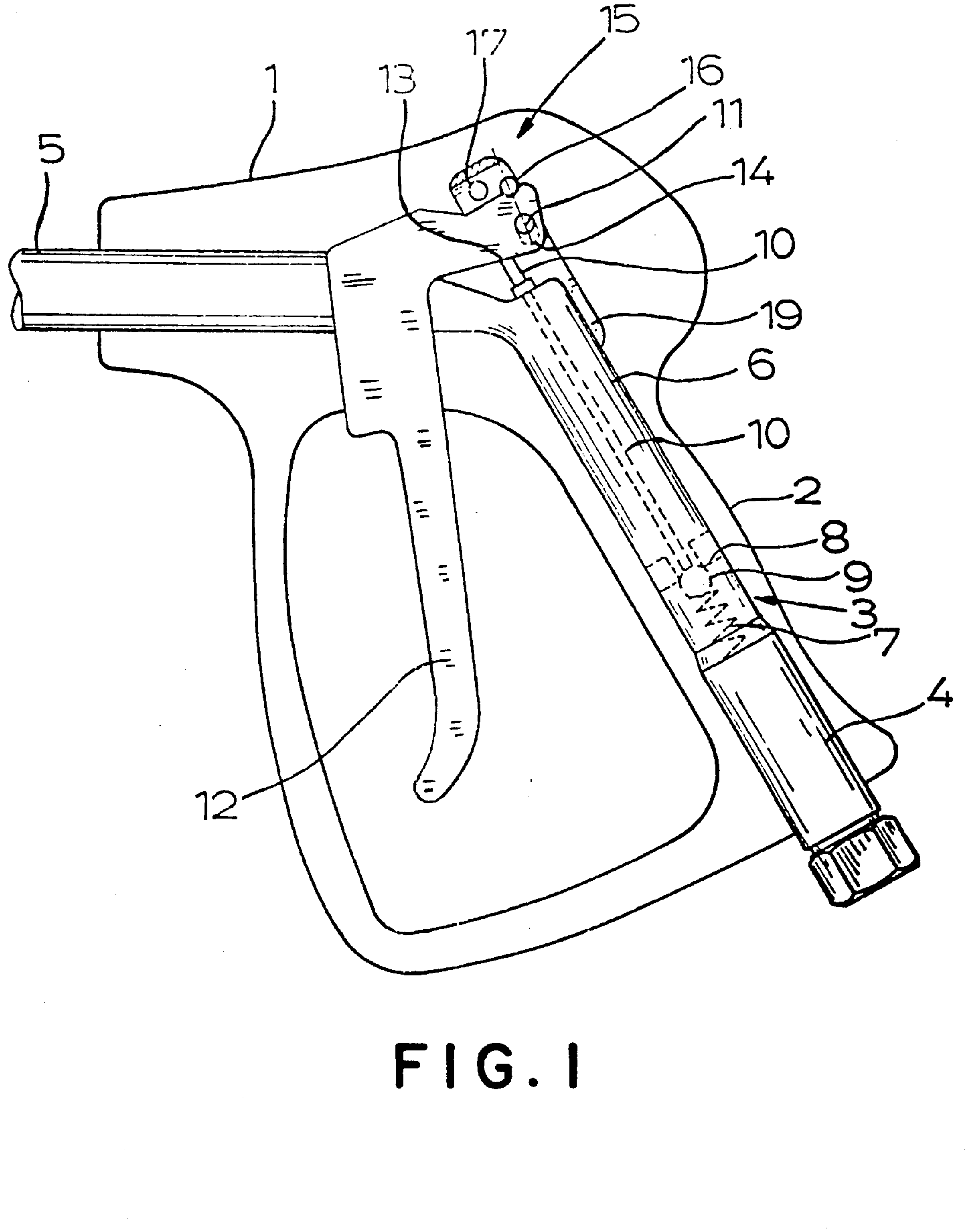
FIG. 1 is a partial section of a pistol housing of a valve pistol according to the invention, in the closed position.

The valve pistol diagrammatically represented in FIG. 1 is intended for a high pressure cleaning device and has first pistol housing 1, which is made of plastic, in the embodiment represented here, and can be formed of two half-shells or as one piece. Handle 2 is formed on pistol housing 1 and valve 3 is placed in pistol housing 1. Valve 3 is located between a pressure medium connection 4 and outlet connection 5, to which a spray lance, not represented here, can be connected. In the embodiment represented, pressure medium connection 4 and outlet connection 5 are integrated with one another in a single continuous L-shaped part 6, in which valve 3 is also placed. Valve 3 is represented as a spherical valve body 9 in the diagrammatic representation merely as an example. Valve 3 opens in a direction toward pressure medium connection 4, and is loaded by a valve spring 7 in a closing direction so as to rest tightly against valve seat 8. Here too, other possibilities exist for the valve construction.

It is further shown that a plunger 10 is provided as the force transmission element which produces the opening movement of valve body 9 against the spring force of valve spring 7 and the closing force resulting from the system pressure on valve body 9. Force transmission element 10, here designed as a plunger, transmits force to valve body 9 from the hand lever 12, which is mounted on a pivot pin 11 to pivot on handle 2 in pistol housing 1.

Figure 2:
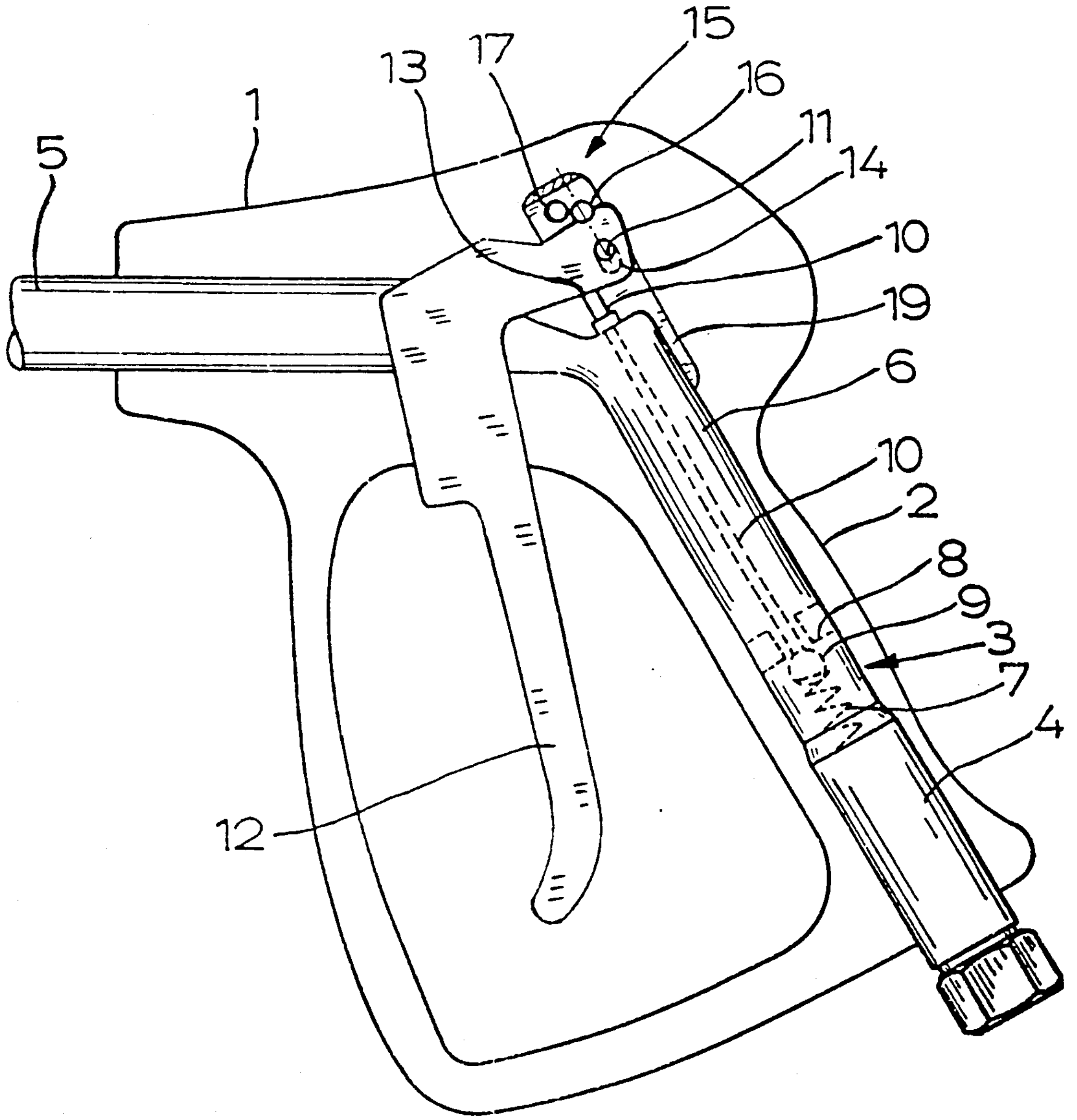
FIG. 2 is a view corresponding to that of FIG. 1, in a partially opened position.
Figure 3:
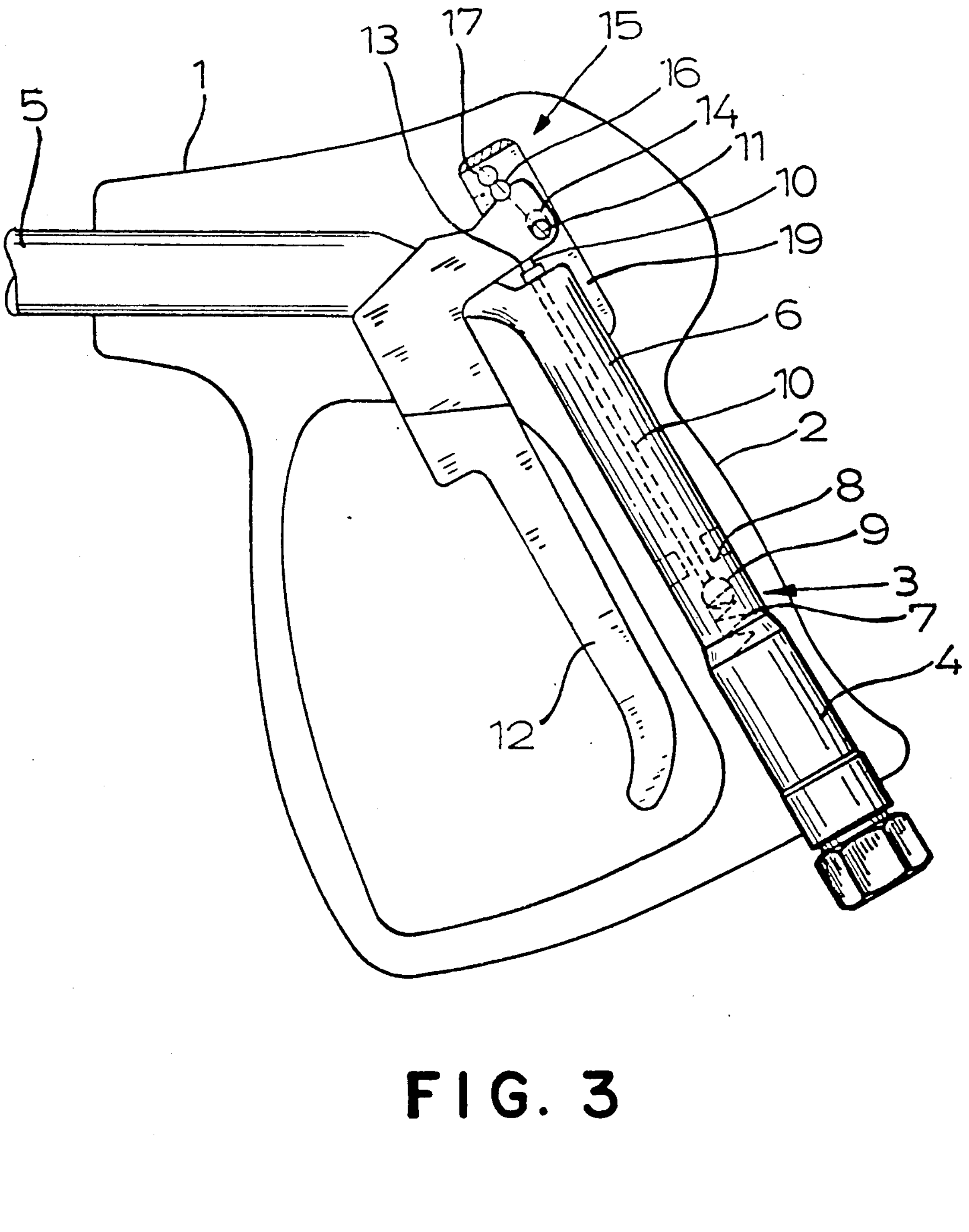
FIG. 3 is a view corresponding to that of FIG. 1, in the opened position.

As usual and as it can be seen from a comparison of FIGS. 1, 2 and 3, human anatomy permits only a certain limited swivel path for hand lever 12. Hand lever 12 has an actuating arm 13 that rests against force transmission element 10. In the illustrated embodiment, the actuating arm 13 is an integral component Of hand lever 12 itself, but easily can project downward on the side opposite pivot pin 11 or can be located in any calculated angle opposite hand lever 12. By hand lever 12 and actuating arm 13, a lever gearing-down with a specific lever ratio is achieved for actuation of force transmission element 10.

For a sufficient flow-through cross section, plunger 10 must be able to be shifted by actuating arm 13 over a certain (minimum) actuation path when valve body 9 is opened. The lever ratio between hand lever 12 and actuating arm 13, in the end, is typically determined by the swivel path of hand lever 12, which is limited in an upward direction, and the actuation path of actuating arm 13, Which is limited in a downward direction.

From a comparison of FIG. 2 and FIG. 3 of the drawing, it follows that hand lever 12 not only performs a pivoting movement around pivot pin 11, but also executes a shifting movement is partially superposed over this pivoting movement as it rotates around pivot pin 11, approximately in the direction of movement of force transmission element 10. This results from pivot pin 11 being able to slide in pistol housing 1 (or the hand lever being able to slide relative to the pivot pin) for a certain distance, essentially, in the direction of movement of force transmission element 10. Here, this is realized by pivot pin 11 being mounted in a slot 14 formed in pistol housing 1 or in a separate support part. Slot 14 extends approximately in the direction of movement of plunger 10 and pin 11 can be shifted in this slot. Correspondingly, the swivel pin could also be mounted in in an appropriate slot of the hand lever.

The shifting movement of hand lever 12 must be initiated in some way. Here, this takes place by the shifting movement of hand lever 12 being derived from the pivoting movement, and for this purpose, an effective drive connection, particularly a wedge-like drive connection 15, is provided between hand lever 12 and pistol housing 1 or L-shaped part 6. Also, other drive connections, for example a tension element, are suitable, but the wedge like drive connection 15 is particularly easy to construct.

The drawing makes it clear that connection 15 can be achieved in a particularly suitable manner by installing a drive part, particularly a drive roller 16, on hand lever 12 at a distance from pivot pin 11, and a stationary support part, particularly support roller 17, on pistol housing 1 or on L-shaped part 6. It is clear that corresponding rollers, as drive or support parts, lead to rolling friction and, thus, to a lower friction coefficient than pure sliding blocks or the like.

Figure 4:
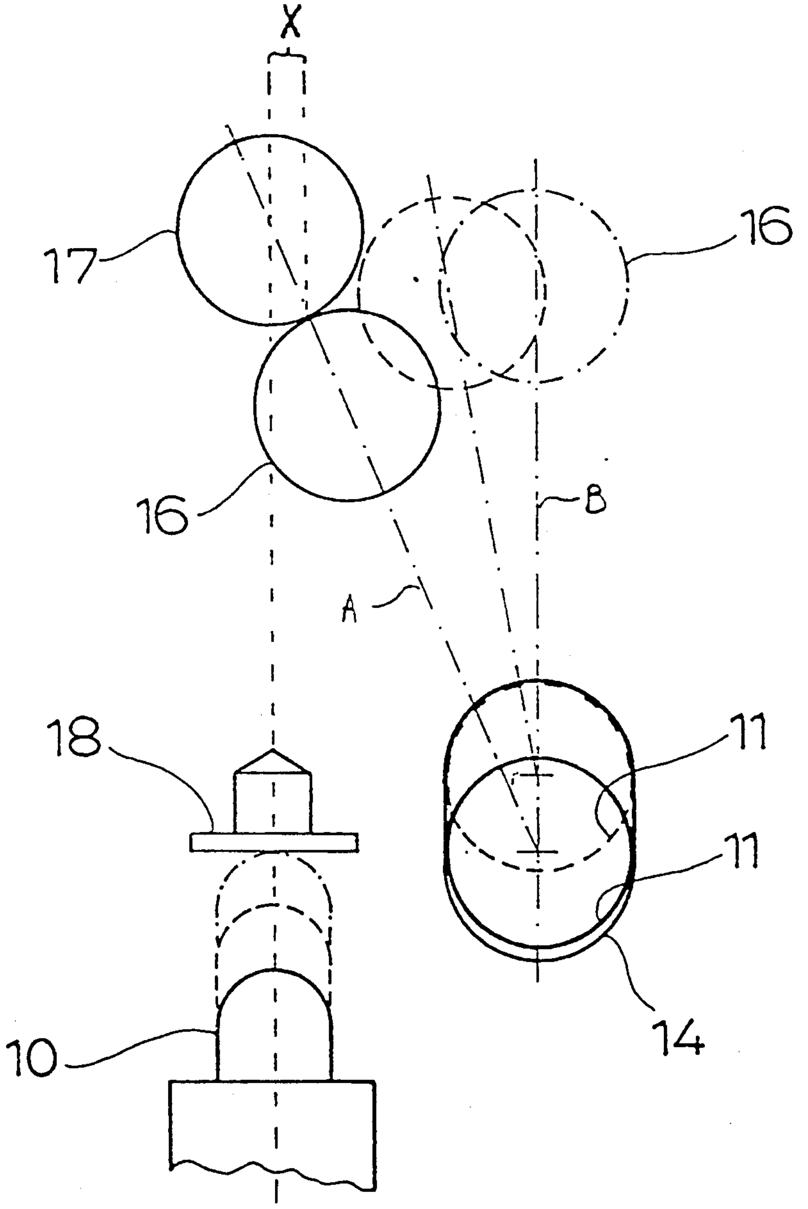
FIG. 4 is a diagrammatic representation of the course of movement of different parts of a valve pistol according to the invention for a better understanding of the operating principle.

FIG. 4 diagrammatically depicts the kinematic relationships occurring during the course of movement in a particularly preferred embodiment. Only the head of force transmission element 10, a lock protection insert 18 in actuating arm 13 that rests against the head of element 10, pivot pin 11 in slot 14 and also gear roller 16 and support roller 17 are represented. The position of the parts when the valve pistol is closed is represented by dot-dash lines, when the valve pistol is pressure relieved by a dash line and when the valve pistol is opened by a solid line, thus corresponding to FIGS. 1, 2 and 3 of the drawing in the same order.

First of all, it is essential that when valve body 9 is closed (dot-dash line), force transmission element 10 is in its highest position and drive roller 16 laterally spaced a short distance from support roller 17, and the effective distance A of support roller 17 from pivot pin 11, i.e., the clear distance between support roller 17 and pivot pin 11, is less than the effective distance B of driver roller 16 from pivot pin 11, measured as the distance of the central points from one another. The lateral distance of the center point of pivot pin 11 from the center point of force transmission element 10 is relatively small; in other words, the lever ratio is relatively large. Now, if in this position hand lever 12 is acted on with a corresponding actuating force, then pivot pin 11 is pressed into the upper curvature of slot 14 and fixed therein and hand lever 12 begins to pivot around pivot pin 11 (from the FIG. 1 position to the FIG. 2 position). At the same time force transmission element 10 (FIG. 4) is pressed downward, for example, by a distance of about 1 mm. This movement is accompanied by a pivoting movement of drive roller 16 around pivot pin 11.

When valve body 9 is slightly opened, and thus largely pressure relieved, drive roller 16 comes to a position laterally of support roller 17 (broken line in FIG. 4), and represents a pressure relieved position of valve body 9. The system pressure is here decreased to 200 bars, for example, and moreover, the restoring force now acts on valve body 9 only from the effective cross sectional area of force transmission element 10, and no longer from the effective cross sectional area of valve body 9 blocking the valve seat. With further pivotal movement of hand lever 12 a shifting movement in the direction of the longitudinal axis of force transmission element 10 is now superposed on the pivot movement around swivel pin 11. In particular, drive roller 16 rolls on support roller 17 and they simultaneously longitudinally shift together with hand lever 12. The additional force needed for this purpose is not particularly large, and in any case, is less than the opening force that had to be summoned initially.

On the one, hand pivot pin 11 now moves downward in slot 14 (compare FIGS. 2 & 3) according to the rolling movement of drive roller 16 on support roller 17, so that a shifting of hand lever 12 parallel to itself is produced; which leads to a corresponding longitudinal shifting of force transmission element 10. On the other hand, only a slight pivoting of hand lever 12 around swivel pin 11 still takes place, so that the effective actuating arm 13 for force transmission element 10 is only slightly extended, even though hand lever 12 performs a further pivoting movement.

The holding force when valve body 9 is opened is already relatively small in this system. But it can be even further reduced, indeed practically down to the point of being self-holding. The reason for this is that drive connection 15 can be configured so that, when valve body 9 is opened, it deflects practically the entire restoring force caused by force transmission element 10 into the stationary support. In the embodiment represented, it is also true that, when valve body 9 is completely opened, the drive part, particularly drive roller 16, rests against the support part, particularly support roller 17, so that the contact point or the contact line is only slightly offset to the point of action or to the line of action of the restoring force exerted by force transmission element 10 on support roller 17. In the embodiment represented, support roller 17 is located precisely in alignment with the center line of force transmission element 10. This is not necessarily required, rather the above explained manner of operation can also be attained when support roller 17 is in a completely different place, for example, even beyond pivot pin 11. Even then, for the restoring force of force transmission element 10, there results a force flow path, which finally ends on the indicated line of action in support roller 17.

In FIG. 4, a slight displacement designated "X" is shown which is still realized here and which leads to it being guaranteed that hand lever 12 always snaps back again, by itself, into the position in which valve body 9 is closed. Nevertheless, by appropriate placement of support roller 17, the "X" value can be made 0. If "X" even becomes "negative," then a displacement results in the other direction, and thus, a self-holding is achieved when valve body 9 is opened. It has proved to be particularly suitable to choose the "X" value, so that a residual holding force of 1 to 3 N results when the valve body is opened.

Figure 5:
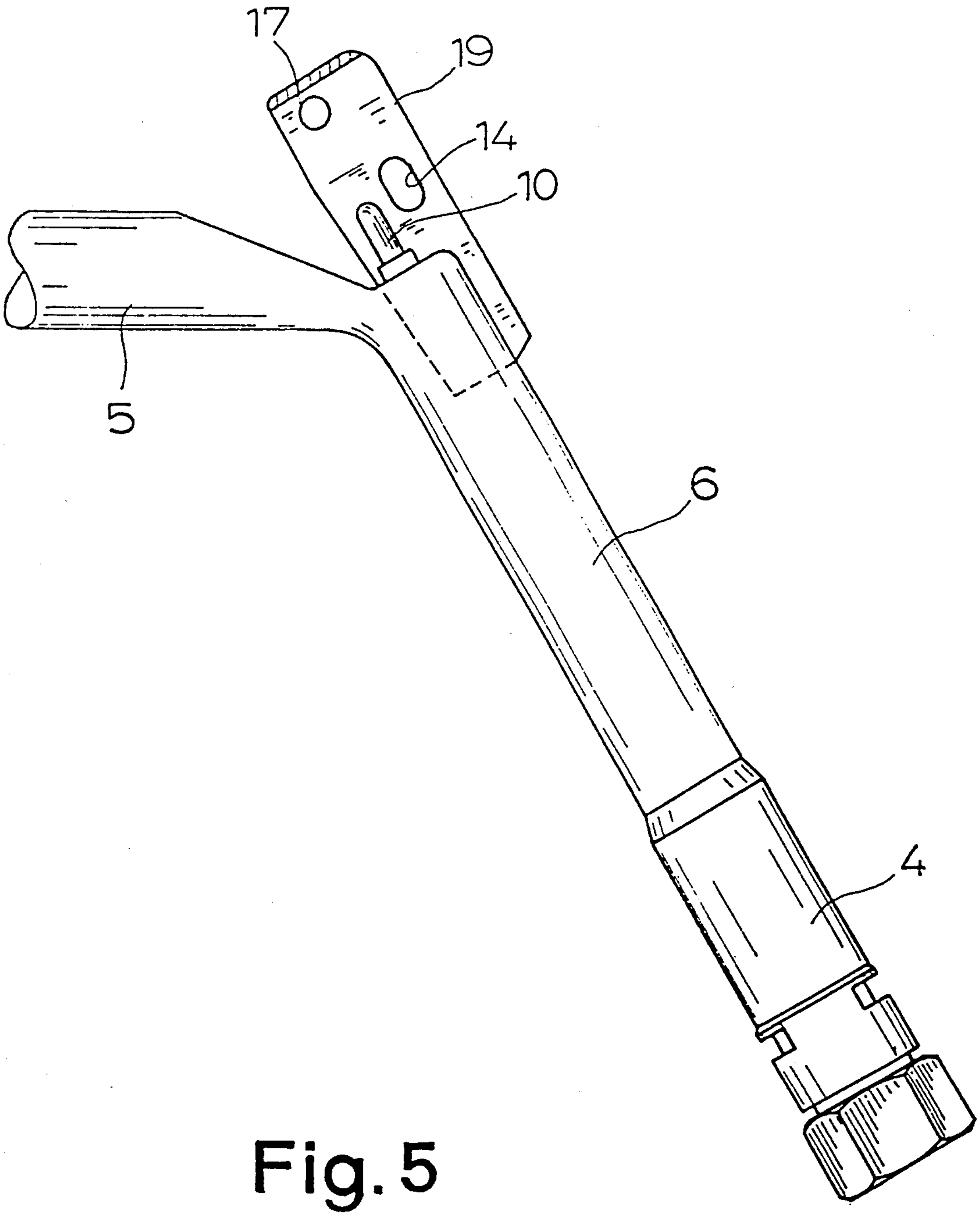
FIG. 5 is a diagrammatic representation of an inner component of a valve pistol according to the invention.

FIG. 5 makes it clear, for example, how on the one hand support roller 17, and on the other slot 14 for pin 11 can be integrated into a usual l-shaped part 6 of a valve pistol in a very simple manner of construction. For this purpose, L-shaped part 6 has bearing bracket 19, which is installed on the L-shaped part 6, in particular, by being welded on. In comparison to being installed on pistol housing 1, this has the advantage that pistol housing 1 can be held free of force.

Overall the invention in a extraordinarily simple construction and succeeds in achieving an optimal force path. More specifically, it makes the initial opening force as small as possible, and nevertheless, in achieving the necessary opening path for the valve body, it also allows the holding force, when the valve body is open, to be made practically as small as desired. The lever ratio at the beginning of the opening movement can be immediately raised to 1:12 to 1:20 because of the superposed shifting movement, and a necessary actuation path for the valve body of, for example, 3 mm is achieved.

While we have shown and described a single embodiment in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

I claim:

1. A valve pistol for a high pressure fluid device comprising a pistol housing with a handle, a valve having a valve body placed in the pistol housing, a force transmission element for producing an opening movement of the valve body against a system pressure, and a hand lever pivotally mounted on a pivot pin in the handle of the pistol housing, said hand lever being pivotable over a certain pivoting path and having an actuating arm that engages against the force transmission element for moving the force transmission element over a determined actuation path, and where, between the hand lever and the actuating arm, there is a certain lever ratio; wherein the pivot pin is pivotably and displaceably received in a slot in one of the pistol housing and the hand lever, said slot extending approximately in a direction of the movement of the force transmission element, so that displacement of the pin in the slot produces a shifting movement of the hand lever that is partially superposed on the pivoting movement of the hand lever around the pivot pin; and wherein the shifting movement of hand lever is derived from the pivoting movement, and as a means for displacing the pivot pin in the slot and shifting the hand lever, an effectively wedge-like drive connection is provided between the hand lever and the pistol housing, said drive connection including a movable drive part carried by the hand lever and a stationary support part mounted in the pistol housing at a distance from the pivot pin; wherein the movable drive part is spaced from the stationary drive part in an initial position of said hand lever corresponding to a closed position of said valve body so that initial pivoting movement of the hand lever produces movement of the force transmission element under the effect of said lever ratio alone and said movable drive part engaging said stationary drive part during a subsequent phase of said pivoting movement of said hand lever so as to produce said superposing of said shifting movement of the hand lever on said pivoting movement of the hand lever by shifting of said pin in said slot so as to increase the movement of the transmission element along said actuation path beyond that producible by said lever ratio alone.

2. Valve pistol according to claim 1, wherein, when the valve body is closed, the movable drive part is located at a distance to one side of the stationary support part, the effective distance of the support part from pivot pin being less than the effective distance of the movable drive part from the pivot pin; wherein, when valve body is slightly opened, and thus essentially pressure-relieved, the movable drive part laterally engages against the stationary support part; and wherein, with further pivoting movement of the hand lever, the movable drive part is displaced in a manner simultaneously causing said shifting movement of the hand lever.

3. Valve pistol according to claim 2, wherein, when the valve body is completely opened, the movable drive part rests against the stationary support part at at least a contact point, said contact point being only slightly offset to a line of action of a restoring force exerted on the stationary support part by the force transmission element.

4. Valve pistol according to claim 3 wherein a continuous L-shaped part for conducting a pressure medium through the pistol is placed in the pistol housing; and wherein a bearing bracket for the pivot pin is welded on the L-shaped part.

5. Valve pistol according to claim 4, wherein said movable drive part and said stationary support part are each in the form of a roller, the roller forming the stationary support part being mounted to said bearing bracket.

6. Valve pistol according to claim 5, wherein said slot is formed in said bearing bracket.

7. Valve pistol according to claim 2, wherein a continuous L-shaped part for conducting a pressure medium through the pistol is placed in the pistol housing; and wherein a bearing bracket for the pivot pin is welded on the L-shaped part.

8. Valve pistol according to claim 7, wherein said movable drive part and said stationary support part are each in the form of a roller, the roller forming the stationary support part being mounted to said bearing bracket.

9. Valve pistol according to claim 1, wherein, when the valve body is completely opened, the movable drive part rests against the stationary support part at at least a contact point, said contact point being only slightly offset to a line of action of a restoring force exerted on the stationary support part by the force transmission element.

10. Valve pistol according to claim 9, wherein a continuous L-shaped part for conducting a pressure medium through the pistol is placed in the pistol housing; and wherein a bearing bracket for the pivot pin is welded on the L-shaped part.

11. Valve pistol according to claim 10, wherein said movable drive part and said stationary support part are each in the form of a roller, the roller forming the stationary support part being mounted to said bearing bracket.

12. Valve pistol according to claim 11, wherein said slot is formed in said bearing bracket.

13. Valve pistol according to claim 1, wherein a continuous L-shaped part for conducting a pressure medium through the pistol is placed in the pistol pin is welded on the L-shaped part.

14. Valve pistol according to claim 15, wherein said movable drive part and said stationary support part are each in the form of a roller, the roller forming the stationary support part being mounted to said bearing bracket.

15. Valve pistol according to claim 14, wherein said slot is formed in said bearing bracket.

16. Valve pistol according to claim 1, wherein said movable drive part is in the form of a roller and said stationary drive part is in the form of a roller.

* * * * *